United States Patent [19]

Graner

[11] Patent Number: 4,690,603
[45] Date of Patent: Sep. 1, 1987

[54] CAR DUMPING APPARATUS

[75] Inventor: Joseph R. Graner, Pittsburgh, Pa.

[73] Assignee: Heyl & Patterson, Inc., Pittsburgh, Pa.

[21] Appl. No.: 751,232

[22] Filed: Jul. 2, 1985

[51] Int. Cl.$^4$ .............................................. B65G 67/00
[52] U.S. Cl. .................................... 414/372; 414/415; 414/421
[58] Field of Search ............... 414/359, 360, 371, 372, 414/415, 419, 421; 298/19 B, 22 R, 22 D

[56] References Cited

U.S. PATENT DOCUMENTS

| | | | |
|---|---|---|---|
| 2,129,394 | 9/1938 | Allen | 414/421 |
| 2,210,250 | 8/1940 | Melville | 414/421 |
| 2,755,001 | 7/1956 | Doepke et al. | 414/421 |
| 2,858,949 | 11/1958 | Doepke et al. | 414/421 |
| 2,963,185 | 12/1960 | Jones et al. | 298/22 P |
| 3,192,875 | 7/1965 | Kroeger et al. | 298/22 R |
| 4,105,130 | 8/1978 | Hardwick et al. | 414/421 |
| 4,134,503 | 1/1979 | Baker | 414/372 |
| 4,168,930 | 9/1979 | Brock | 414/421 |
| 4,531,877 | 7/1985 | Carroll | 414/372 |

Primary Examiner—Lawrence J. Oresky
Attorney, Agent, or Firm—Harry B. Keck

[57] ABSTRACT

A car dumping apparatus intended for open top railway cars or other containers which are moved sequentially through a supporting frame and are rotated upwardly and to one side about a single horizontal axis to discharge the contents onto a dumping area located on one side. A first hydraulic piston motor rotates the frame and railroad car as a combination about the horizontal axis. Thereafter a second hydraulic piston motor advances the combination of frame, railroad car, an intermediate support member and the first hydraulic piston motor, as a combination, about the same horizontal axis until the open top of the railroad car confronts the dumping area whereby the contents of the railway car are spilled onto the dumping area. Economies of construction and operation are achieved as a result of the rotation about a single horizontal axis. A preferred embodiment recognizes and exploits the fact that the frame and railroad car combination has a higher centroid level when the railroad car is loaded than when the railroad car is empty. This relocation of the centroid axis permits the final upward movement of the railroad car and frame to be powered by gravity and permits the return movement of the frame and empty railroad car to be accomplished through gravity. As a consequence, it is not necessary to employ double acting hydraulic piston motors in many installations. In those installations where double acting hydraulic piston motors might be included in a design, such double acting hydraulic piston motors can be normally operated as single acting hydraulic piston motors with accompanying savings in operating expense.

6 Claims, 5 Drawing Figures

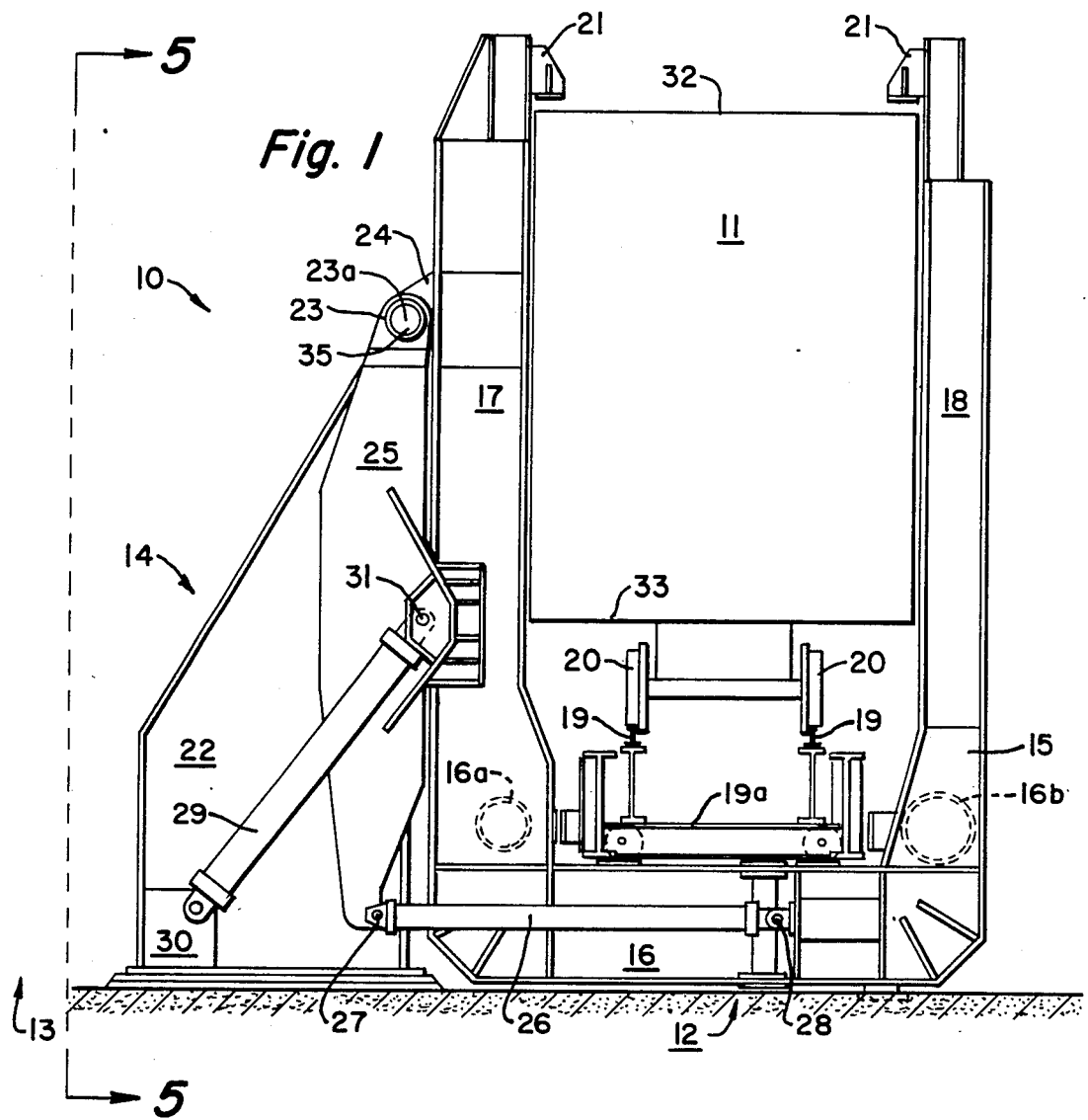

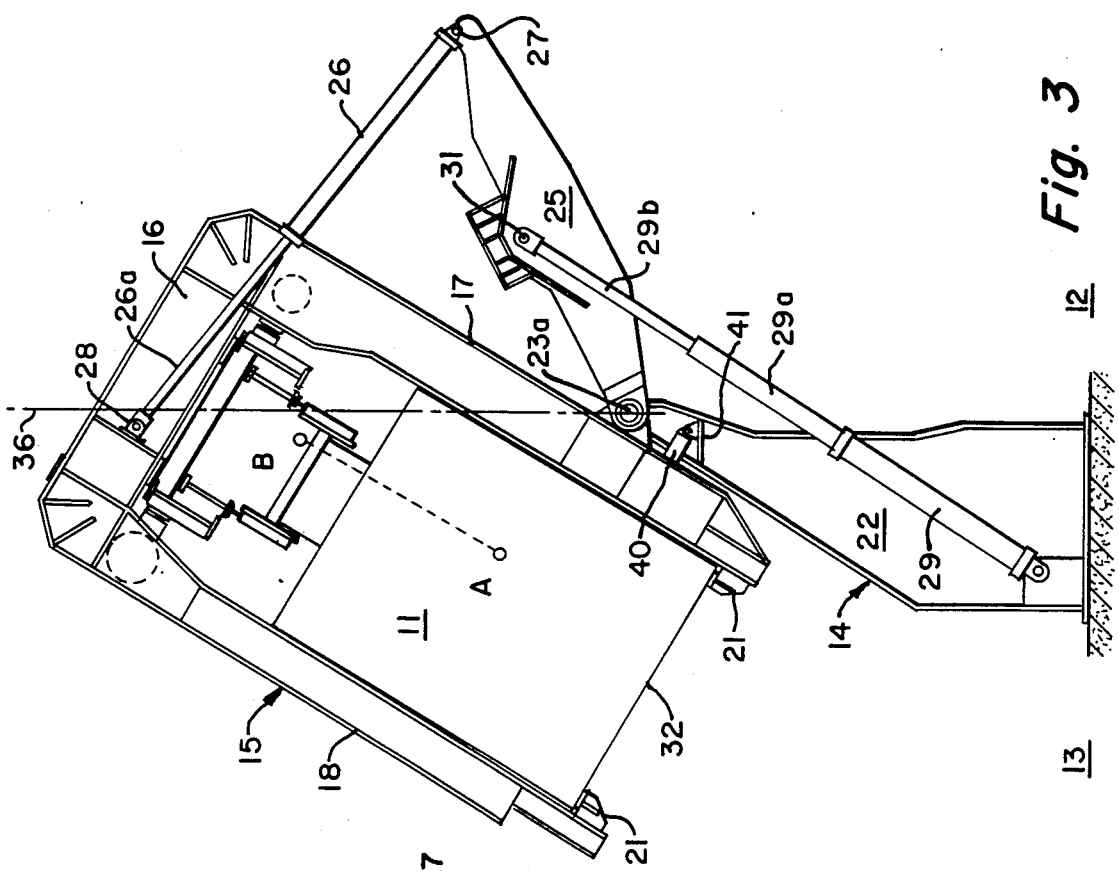
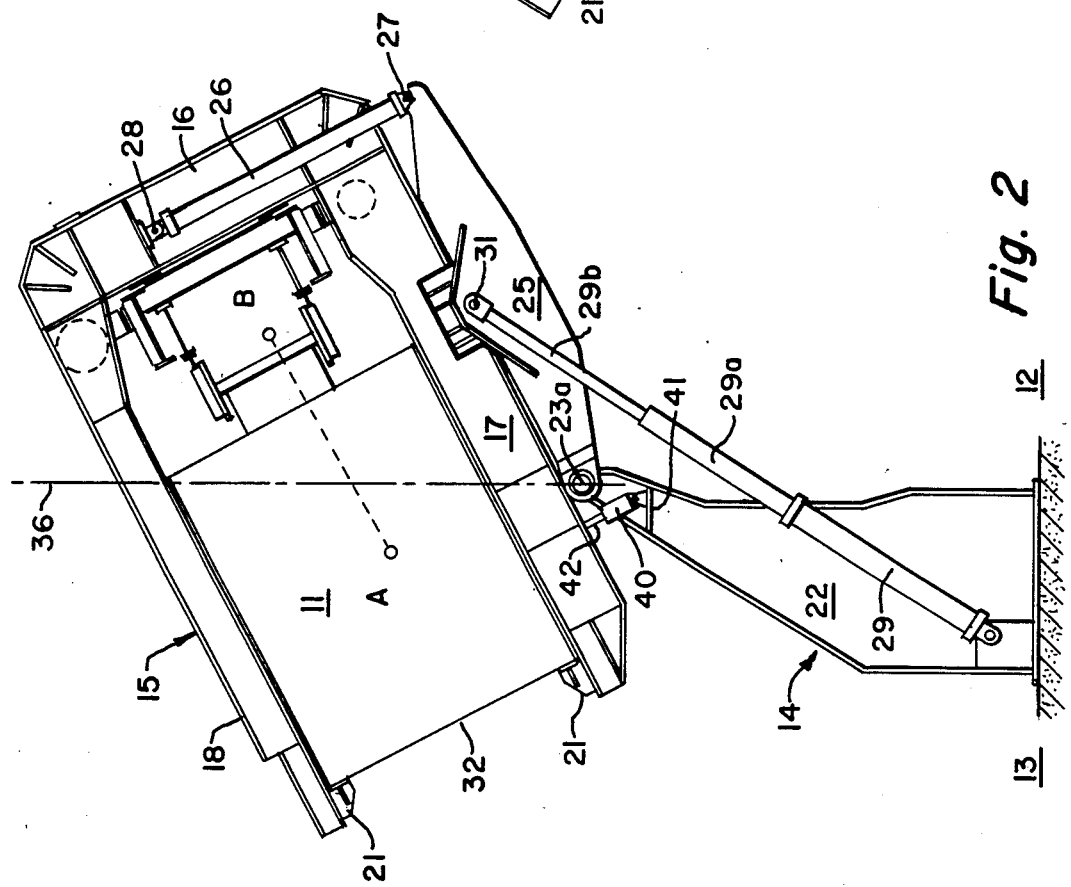

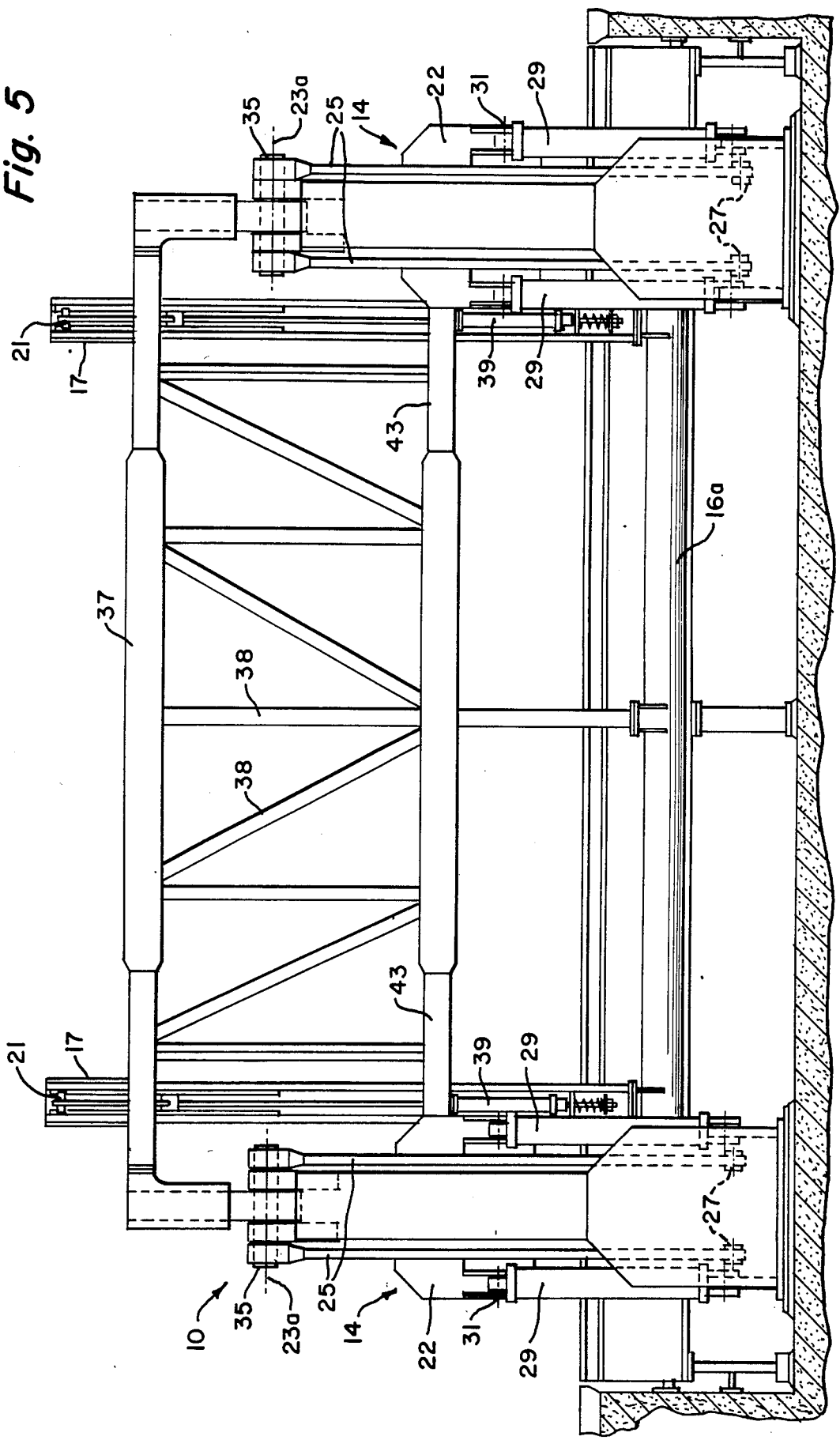

CAR DUMPING APPARATUS

BACKGROUND OF THE INVENTION

1. Field of the Invention

This invention concerns dumping apparatus for lifting and turning a loaded railroad car or other container, upwardly and to one side until the top of the container faces the ground permitting the contents of the container to spill by gravity onto a dumping area. More particularly, the invention provides appropriate frame means in a railroad car parking area which rigidly engage the railroad car or other container and provides further means for rotating the frame and engaged railroad car or other container as a unit about a generally horizontal axis which is positioned to one side of the frame means. The movement of the frame and railroad car or other container about a single generally horizontal axis is achieved by means of two hydraulic piston motors, each of which is secured to an intermediate support member which is pivotal about the same generally horizontal axis. A first hydraulic piston motor connects the intermediate support member to the frame means. A second hydraulic piston motor connects the intermediate member to support means located between the container parking area and the dumping area.

2 Description of the Prior Art

Numerous devices are known for cradling a railroad car in a frame and elevating the frame and engaged railroad car as a combination upwardly and sidewardly for the purpose of dumping the contents of the railroad car on to a dumping area located beside the railroad tracks on which the railroad car is delivered to the dumping installation. A number of these apparatus employ pulleys or chains (or ropes or cables) to elevate the railroad car and frame and thereafter to move the railroad car into a dumping position. See U.S. Pat. Nos. 556,458, to CLARKSON; 564,646, to RASCH; 665,025, to LONG; 711,728, to LONG; 720,557, to BROWNING; 1,009,331 to McMYLER; 1,084,437; to HULETT; 1,575,415, to CRIST. Other car dumping apparatus rotates the railroad car frame combination about a single generally horizontal axis. See U.S. Pat. Nos. 1,360,607, to WILLIAMSON et al; 1,478,723, to WRIGHT; 1,585,730, to MITCHELL; 1,590,826, to HULETT; 1,654,919, to CASE; 1,700,693, to BILES; 1,833,309, to SHUTT; 2,054,199, to KALTENBACH. Car dumping apparatus employing gears and large rotatable gear segments is disclosed in U.S. Pat. No. 1,700,693, BILES.

A recent development is a dumping apparatus which employs two hydraulic piston motors for the purpose of turning a railroad car and an engaged frame about two generally horizontal parallel, separate axes. See U.S. Pat. No. 4,134,503, BAKER.

The difficulties of operating railroad apparatus with pulleys and chains (or ropes or cables) or with large gear segments are numerous. There are many advantages for the use of hydraulic piston motors of the type described in the BAKER patent, supra. However the BAKER device utilizes two distinct, spaced-apart horizontal axes and uses two hydraulic piston motors with a two-piece intermediate element. The two-piece intermediate element rotates about one of the two horizontal axes while maintained in a rigid relationship with the frame. Thereafter the second hydraulic piston motor rotates the frame and car assembly about an axis on the two-piece intermediate element. The arrangement creates over-reach whereby at least one of the hydraulic piston motors must be double-acting in order to return the frame and dumping railroad car to the initial position. The thrust of the hydraulic piston motor of the BILES apparatus is directed away from the direction of movement requiring significant excess pressure to advance the hydraulic piston motor.

STATEMENT OF THE PRESENT INVENTION

According to the present invention, a car dumper apparatus is provided with a frame rotatably secured to a generally horizontal axis positioned to one side of a car parking area. An intermediate support member also is secured rotatably to the same generally horizontal axis. Two hydraulic piston motors are provided. One piston motor moves (as a unit) the intermediate support member and frame, pivotally about the generally horizontal axis. The other piston motor moves the frame with its contained railroad car pivotedly about the same horizontal axis away from the intermediate support member. At the end of the stroke of one hydraulic piston motor, the frame and contained railroad car is in an elevated position, pivoted about the horizontal axis. Thereafter the other hydraulic piston motor rotates the frame and its contained railroad car about the same generally horizontal axis from an intermediate position to a final car-dumping position. A number of advantages from this design are apparent when compared with the BAKER design of the prior art. First, by employing a single horizontal axis, there is a substantial reduction in the number and size of the moving parts in the complete installation. Secondly, by rotating the frame and railroad car about a single horizontal axis, the length of the rotating-radius is economized and the unsupported length of the hydraulic piston motors is reduced. Third, the total energy required for each car dumping operation is reduced because the total elevation lifting force required of the dumping apparatus is less. Fourth, the hydraulic piston motors operate through a longer stroke despite the fact that the frame and container car rotate over a smaller radius. This permits smaller hydraulic piston motors operating at lower hydraulic pressures. Fifth, the hydraulic piston motors exert their thrust more nearly in line with the intended movement so that the need for significant excess pressure is avoided. Sixth, the swing of the structure about a single horizontal axis provides a compact movement requiring less space.

In a preferred embodiment, the present car dumping apparatus avoids the need for using double acting hydraulic piston motors and can operate with lower cost, less complex single acting hydraulic piston motors because the centroid of the frame with an unloaded railroad car or other container is retained on the parking area side of a vertical plane extending through the generally horizontal axis whereby gravity will return the frame and an unloaded railroad car or other container to the initial position.

These objects and advantages are obtained in the present invention by providing a car dumping installation including a parking area for the railroad car or other container, a dumping area space to the side of the parking area, and rigid support means positioned between the dumping area and the parking area. The rigid support means contain appropriate bearings to define a single generally horizontal axis. A frame means for securing a railroad car in the parking area is rotatably connected to the generally horizontal axis. An intermediate support member also is rotatably connected to the same generally horizontal axis. Two hydraulic piston motors are provided: the first hydraulic piston motor connects the frame at one end and the intermediate support member at the other end; the second hydraulic piston motor connects the intermediate support member and a mounting block which is rigidly fixed adjacent to the said rigid support means. The two hydraulic piston motors are operated in sequence. One of the piston motors elevates the frame and contained railroad car to an intermediate position and thereafter the other piston motor elevates the frame and contained railroad car to the final dumping position. The piston motors are retracted as the frame and its contained empty railroad car are returned to the parking position. One or both of the hydraulic piston motors may be double-acting, i.e., can generate powered lengthwise thrust in both directions. Such double-acting piston motor or motors may initiate movement of the frame and contained empty car to the parking position. However in a preferred embodiment, the double-acting piston motors can be avoided by dumping the railroad car from a position in which the centroid of the frame and contained car assembly is shifted to the parking side of a vertical plane extending through the horizontal rotation axis as the load is removed from the railroad car. By this design, gravitation force will initiate and complete the return of the frame and contained car.

In one embodiment, the first hydraulic piston motor moves the frame to an intermediate elevated position and thereafter the second hydraulic piston motor moves the frame to the final dumping position. In an alternative embodiment, the second hydraulic piston motor moves the frame to an intermediate position and thereafter the first hydraulic piston motor moves the frame to the final dumping position. The rotation of the frame and railroad car is terminated when the railroad car or other container has experienced approximately 140 degrees of rotation. In this position, the open top of the railroad car or other container will be confronting the dumping area to the side of the parking area and permit the contents of the railroad car or other container to spill on to the dumping area. The rotation of the frame and railroad car can exceed 140 degrees if desired.

DESCRIPTION OF THE DRAWINGS

FIG. 1 is an end view of the dumping apparatus with an open top railroad car positioned within a frame structure.

FIG. 2 is another end view similar to FIG. 1, showing the car dumping apparatus at an intermediate position.

FIG. 3 is another end view, similar to FIGS. 1 and 2, showing the dumping apparatus in its final dumping position.

FIG. 5 is a side elevation of the dumping apparatus taken along the lines 4—4 of FIG. 1.

Referring to FIG. 1, there is illustrated a car unloader 10 for an open top railroad car 11 which has a bottom 33 and a top 32. The car unloader site includes a parking area indicated by the numeral 12, a dumping area indicated by the numeral 13, and a rigid support means indicated by the numeral 14. Two or more support means are employed as seen in FIG. 4.

Figure 4:
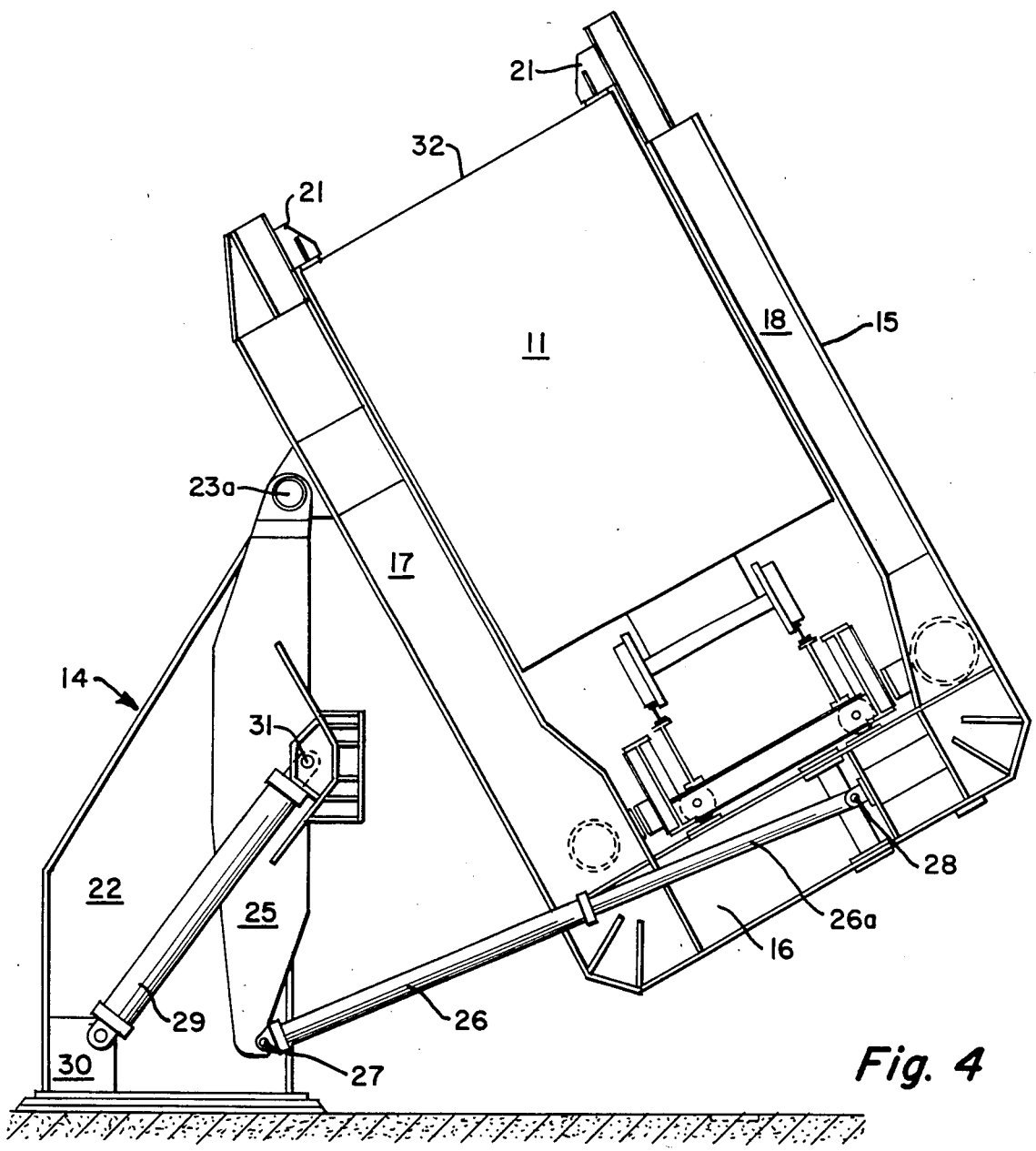
FIG. 4 is another end view similar to FIG. 1, showing the car dumping apparatus in an alternative intermediate position.

A frame 15 has a generally U-shaped configuration with a base 16 and parallel columns 17, 18. The base 16 supports railroad tracks 19 on which the open top railroad car 11 is supported by means of its wheels 20. A connecting beam or pipe 16a (FIG. 5) joins the bases 16 of the U-shaped frames 15 to provide rigidity for the frames and to permit connection to weighing apparatus 19a which supports the rails 19. In the preferred embodiment, two U-shaped frames 15 and two stanchions 22 are employed. More than two such frames 15 and stanchions 22 may be provided if desired. Retractable securing elements 21 are adapted to move longitudinally with respect to the columns 17, 18 to engage the railroad car 11 at one or more locations on the top sides and rigidly confine the railroad car 11 within the frame 15 with the wheels 20 engaged on the rails 19. The clamps 21 may be operated by hydraulic motors 39, FIG. 5. Some frames 15 provide side-clamping units for cars rather than the top clamps 21.

The rigid support means 14 includes a stanchion 22 rigidly connected to the ground. The upper end of the stanchion 22 is provided with a horizontal bearings 23 defining a generally horizontal axis 23a. A shaft or tube 35 in bearings 23 engages a bracket plate 24 connected to the column 17 which is adjacent to the support means 14. One or two intermediate support members 25 (two shown—FIG. 5) are rotatably connected to the horizontal shaft or tube 35 for each support means 14.

A first hydraulic piston motor 29 has one or more pistons 29a, 29b and has its bottom end secured pivotally to a mounting block 30. The upper end of the hydraulic piston 29b is secured in the mid-region of the intermediate support member 25 by a mounting pin 31.

A second hydraulic piston motor 26 has one end connected to a mounting pin 27 on the bottom end of the intermediate support plate 25 and has its other end pivotally secured to a mounting block 28 on the base 16 of the frame 15.

The horizontal shaft or tube 35 is positioned at a level between the bottom 33 and top 32 of the railroad car 11.

A source of pressurized hydraulic fluid (not shown in drawings) is provided to supply the required hydraulic fluid for the motors 26, 29. Note in FIG. 5 that the hydraulic motors 29 are provided in pairs, each one engaging one of a pair of intermediate support plates 25. Similarly, although not shown in FIG. 5, the hydraulic motors 26 are provided in pairs each pivotally connected to the intermediate support plates 25 at the mounting pins 27.

Operation

In order to operate the dumping apparatus, the railroad car 11 is positioned centrally within the parking area 12 with the wheels 20 resting on the rails 19. The retractable securing elements 21 are drawn toward the columns 17, 18 to engage the sides of the top surface 33 of the railroad car 11 so that the car is firmly retained within the frame 15 (FIGS. 2, 3, 4).

One Embodiment

The first hydraulic piston motor 29 is activated and the pistons 29a, 29b extend to rotate the frame 15, the car 11 and the intermediate support plate 25 about the horizontal axis 23a to a position shown in FIG. 2. Note in FIG. 2 that the intermediate support plate 25 is retained in its initial position with respect to the frame 15 but has rotated about the common axis 23a.

Thereafter, the second hydraulic piston motor 26 is activated to extend the piston rod 26a which rotates the frame 15, as a unit, about the same horizontal axis 23a to a position shown in FIG. 3 where the open top 32 of the railroad car 11 confronts the dumping area 13 to permit the contents of the railroad car 11 to fall onto the dumping area. The first hydraulic piston motor 29 performs most of the work required to raise the frame 15 and railroad car 11 in the vertical direction.

Another Embodiment

As shown in FIG. 4, the second hydraulic piston motor 26 may be activated and its piston 26a extends to rotate the frame 15 and the car 11 about the horizontal axis 23a to an intermediate position. Note in FIG. 4, that the intermediate support plate 25 is retained in its initial position with respect to the rigid support 22 and with respect to the axis 23a. Thereafter the first hydraulic piston motor 29 is activated to extend the piston rod 29a which rotates the intermediate support 25 and the frame 15 as a unit about the same horizontal axis 23a to the final dumping position shown in FIG. 3. The first hydraulic piston motor 29 again performs most of the work required to raise the frame 15 and contained railroad car in a vertical direction.

The second hydraulic piston motor 26 has lower power requirements because its thrust is more horizontal than vertical and thus may be smaller than the first hydraulic piston motor 29. The second hydraulic piston motor is preferably the single-acting piston motor type to reduce costs, but may be double-acting if desired.

Preferably the centroid of the assembly of the combination of railroad car 11 (empty) and frame 15 should be maintained on the railroad track side of a vertical plane 36 extending through the horizontal axis 23a to avoid the need for double acting hydraulic piston motors in order to return the frame 15 and unloaded car 11 to the parking area 12. The centroid of the combination of loaded railroad car 11 and frame 15 is indicated by the point A which represents a horizontal line extending through the longitudinal centroid axis of the combination normal to the drawing of FIGS. 1, 2, 3 and 4. The centroid of the combination of empty railroad car 11 and frame 15 is closer to the base 16 and is indicated by the point B which represents a horizontal line extending through the longitudinal centroid axis of the combination normally to the drawing of FIGS. 1, 2 and 3. By counterweighting the frame 15, added control of the location of the centroids A, B can be achieved. Counterweights may be added, for example, inside the tube 16a or secured to the surface of the tube 16b. The counterweights, if employed, are preferably secured to the frame 15 remote from the horizontal axis 23a.

Note that the centroid A of the combination of frame and loaded railroad car is well spaced-apart from the base 16 because of the weight of the railroad car load. The centroid B of the combination of frame 15 with an unloaded railroad car 11 is closer to the base 16 because the load of the car has been dumped and is no longer contained in the rotatable combination. Note in FIG. 2 that the centroid A is on the dumping area side of a vertical plane 36 extending through the horizontal axis 23a. During further rotation of the frame and car, the centroid A passes the vertical plane 36 and the remainder of the movement of the frame 15 and railroad car 11 requires no additional hydraulic energy since gravity will complete the rotation.

After the contents of the railroad car 11 have spilled onto the dumping area 13, as shown in FIG. 3, the centroid of the combination of frame 15 and empty railroad car 11 relocates at B. In FIG. 3, the centroid B is shown on the left side (the unloading side) of the vertical plane 36. In order to restore the frame 15 and empty car 11 to the parking position, at least one of the cylinders 26, 29 must be double-acting and energy must be applied in the reverse direction.

In a preferred embodiment, the final dumping position of the frame 15 will encompass less rotation than the 150 degrees shown in FIG. 3 whereby the centroid B can be returned on the parking area (12) side of the vertical plane 36. Total rotation of 110 to 140 degrees will achieve this result. Then the assembly of frame 15 and car 11 will return by gravity to the parking position of FIG. 1 and the double-acting cylinder can be avoided. Gravitation forces act to reduce the time needed to return the frame 15 to the parking position.

In some instances, where there is a possibility of blockage in the railroad car 11 (e.g., frozen coal or other frozen or bridged loads), it may be desirable to provide one of the hydraulic piston motors, preferably the first hydraulic piston motor 29 in the form of a double acting motor so that a loaded railroad car 11 can be returned to the parking position of FIG. 1 if this becomes necessary. In warm weather and in the absence of load-blockage, such double-acting hydraulic piston motors may be operated as single-acting motors at some cost savings. However in installations where freezing temperatures are not anticipated and the normal loads are non-packing, the design feature just described permits use of only single acting hydraulic piston motors which are substantially lower in initial cost as well as maintenance than the double acting piston motors required by prior art hydraulic car unloaders. Savings result from reducing the time required to raise, dump and return each car.

After a railroad car 11 has been unloaded and returned to the parking position illustrated in FIG. 1, that railroad car is advanced out of the frame 15 and a next railroad car is introduced into the frame 15 for unloading.

In the preferred embodiment, the first and second hydraulic piston motors 26, 29 are single-acting devices. The hydraulic piston motors 26, 29 may establish a final dumping position for the assembly of the frame 15 and car 11 as shown in FIG. 3—that is, with the centroid B on the dumping side of the vertical plane 36. Then it is feasible to add a supplemental small third single-acting hydraulic piston motor 41 (FIGS. 2, 3) which acts in the reverse direction, to return the subassembly of the frame 15 and contained car 11 to a position where the centroid B is on the parking side of the vertical plane 36, i.e., to a gravity-lowering position. Such supplemental third hydraulic piston motor 41 eliminates the need for the expense and maintenance of double-acting hydraulic piston motors. The third hydraulic motor 41 is secured to a pillow block 42 mounted on a stanchion 22. The third hydraulic motor 41 has a piston 42 which engages at its forward end with the column 17. The piston 42 (not seen in FIG. 3) is fully retracted in FIG. 3 and is extended in FIG. 2 until the centroid B passes the vertical plane 36. Use of the third hydraulic motor 41 with a small stroke permits the use of single acting motors 26, 29 under all conditions. The third hydraulic motor may have a sufficient stroke to return the car 11 to a position where the centroid A is on the parking area side of the vertical plane 36 to permit recovery of the car 11 if its contents are stuck (e.g., frozen) in the car.

As shown in FIG. 5, there are two first hydraulic piston motors 29 and two second hydraulic piston motors 26 in each rigid support means 14. It should be apparent that only one of the four illustrated hydraulic piston motors in each rigid support means 14 must be double-acting; the others can be single-acting hydraulic piston motors which are less costly to purchase, install and operate.

Also shown in FIG. 5 are two horizontal girders 37, 42 connecting the column 17. Struts 38 join the girders 37, 42. The rigid assembly of the girders 37, 43 and struts 38 provide a truss upon which the rail car 11 rests during the dumping.

I claim:

1. Apparatus for dumping an open top railroad car comprising:
   a railroad car damping site including: a parking area for said railroad car; a dumping area spaced from said parking area; and support means between said dumping area and said parking area; said support means defining a generally horizontal axis generally parallel to the lengthwise axis of said railroad car in said parking area; means for advancing a said railroad car into the said parking area;
   frame means rigidly engageable with said railroad car, said fram means being connected to said support means for rotation movement about said horizontal axis;
   an intermediate support member connected to said support means for rotation movement about said horizontal axis;
   a first hydraulic piston motor pivotally connected at one end to said support means and pivotally connected at the other end to the said intermediate support member at the central portion thereof between the said first and second ends of said intermediate support member, whereby extension of said first hydraulic piston motor causes a rotation movement of the combination of said frame means and said railroad car and said intermediate member about said horizontal axis;
   a second hydraulic piston motor pivotally connected at a first end to the bottom of said intermediate support member and pivotally connected at a second end to said frame means whereby extension of said second hydraulic piston motor causes rotation movement of the combination of said frame means and said open top railroad car about said horizontal axis;
   wherein the said horizontal axis defines a vertical plane and wherein the combination of said frame and said railroad car in its loaded condition has a centroid which passes through the said vertical plane prior to completion of rotation movement of the said combination; and
   wherein the said combination of said frame and said railroad car in an unloaded condition has its centroid positioned nearer to the base of said frame on the parking area side of the said vertical plane when the combination of said frame and said railroad car is in the maximum rotation position;
   whereby the extendion of said first and said second hydraulic piston motors positions the said frame in a dumping position to a final position where the said railroad car is positioned above said support means with its open top facing said dumping area.

2. The apparatus of claim 1 wherein the first and second hydraulic piston motors are single acting hydraulic piston motors.

3. The apparatus of claim 2 including a third single-acting hydraulic piston motor secured at one end to said support means and including a hydraulic piston engageable with said frame means, and being adapted to rotate the said frame and railroad car assembly from a said dumping position in which the said centroid is on the dumping side of said vertical plane to a gravity-lowering position in which the said centroid is on the parking side of said vertical plane.

4. The apparatus according to claim 1 wherein the energy required to rotate the combination of said frame and said railroad car in its loaded condition for the final rotation movement is supplied by gravity; and
   wherein the energy required to restore the said combination of said frame and said railroad car to a parking position is supplied solely by gravity.

5. The apparatus of claim 4 wherein one of said hydraulic piston motors is a single acting hydraulic piston motor and the other of said hydraulic piston motors is a double acting hydraulic piston motor operating solely as a single acting hydraulic piston motor.

6. The apparatus of claim 4 wherein counterweights are secured to the said frame to influence the location of the centroid of the frame and railroad car assembly.

* * * * *